(12) United States Patent
Canova

(10) Patent No.: US 6,590,060 B1
(45) Date of Patent: Jul. 8, 2003

(54) PROCESS FOR MANUFACTURING POLYESTER

(75) Inventor: Thomas Canova, Santo André (BR)

(73) Assignee: Rhodia Ster S.A., Sao Paulo (BR)

( * ) Notice: Subject to any disclaimer, the term of this patent is extended or adjusted under 35 U.S.C. 154(b) by 0 days.

(21) Appl. No.: 09/857,263

(22) PCT Filed: Nov. 25, 1999

(86) PCT No.: PCT/BR99/00099

§ 371 (c)(1),
(2), (4) Date: Aug. 30, 2001

(87) PCT Pub. No.: WO00/32673

PCT Pub. Date: Jun. 8, 2000

(30) Foreign Application Priority Data

Nov. 27, 1998 (FR) .............................. 98 15166

(51) Int. Cl.[7] .............................. C08G 63/02
(52) U.S. Cl. ...................... 528/272; 528/271
(58) Field of Search ................. 528/271, 272

(56) References Cited

U.S. PATENT DOCUMENTS

| | | |
|---|---|---|
| 3,390,134 A | 6/1968 | Kibler |
| 4,080,317 A | 3/1978 | Morawetz et al. |
| 4,613,664 A | 9/1986 | Tate et al. |
| 4,755,587 A | 7/1988 | Rinehart |
| 5,164,478 A | 11/1992 | Lee et al. |
| 5,225,448 A | 7/1993 | Maier et al. |
| 5,744,578 A | 4/1998 | Duh |

FOREIGN PATENT DOCUMENTS

| | | |
|---|---|---|
| GB | 1 101 900 | 1/1968 |

OTHER PUBLICATIONS

Chemical Abstracts, vol. 89, No. 12, Sep. 18, 1997, abstract No. 90449, (XP002112011).
Derwent Publications Ltd., AN 80–19011C (XP002112015).
Chemical Abstracts, vol. 97, No. 6, Aug. 9, 1982, abstract No. 39561, (XP002112012).
Chemical Abstracts, vol. 113, No. 2, Jul. 9, 1990, abstract No. 7046,(XP002112013).
Derwent Publications Ltd., AN 91–234125 (XP002112016).
Chemical Abstracts, vol. 91, No. 6, Aug. 6, 1979, abstract No. 40779, (XP002112014).

*Primary Examiner*—Terressa M. Boykin
(74) *Attorney, Agent, or Firm*—Darby & Darby

(57) ABSTRACT

The present invention refers to a process for manufacturing polyester comprising at least the following steps: (a) esterifying or transesterifying a carboxylic diacid or a dieester of a carboxylic diacid with a diol, (b) polymerizing in melt phase the esterification or transesterification product, (c) solidifying and granulating, (d) placing in contact the granules with a liquid swelling medium, and (e) post-condensing the granules in solid phase. The realization of the immersion step in a swelling medium permits increasing the kinetics of the solid phase post-condensation step.

8 Claims, No Drawings

PROCESS FOR MANUFACTURING POLYESTER

The present invention refers to the manufacturing of polyester-type polymers and refers particularly to the solid phase post-condensation steps.

The manufacture of polyesters is generally carried out in several steps. The first step is a step of esterification or transesterification of a carboxylic diacid or a diacid diester with a diol. This step is followed by a melt phase polymerization step. As the reaction advances, the product becomes more and more viscous. Above a certain viscosity the technology used nowadays does not permit the continuation of the reaction. The viscosity limit attained in melt phase is generally around 85 ml/g (viscosity index). If higher molecular weight compounds are to be obtained, it is necessary to proceed with the reaction in solid phase. This step is called a solid phase post-condensation step. It consists in proceeding with the condensation through heating in a gaseous medium or under vacuum, the polymer being in the form of solid elements. This step is very slow and constitutes a limiting step in the process of manufacturing a polyester.

It is known that a limiting factor in solid phase post-condensation is the diffusion of condensation by-products within the polymeric mass. To speed up the solid phase post-condensation, U.S. Pat. No. 5,391,694 discloses a process which permits the increase of the exchange surface between the solid particles and the gaseous medium surrounding them by providing them with particular shapes during solidification. U.S. Pat. No. 4,755,587 teaches manufacturing porous tablets by compacting crystalline very light granulometry polymer powders. U.S. Pat. 5,532,335 teaches the improvement in heat transfer within a solid phase post-condensation medium by effecting the same in a liquid eventually pressurized medium and by increasing the post-condensation temperature.

Notwithstanding the progress reached, efforts are always being made to obtain an improved performance solid phase post-condensation step. The object of the present invention is to accelerate condensation kinetics by improving the diffusion of the condensation by-products outwards from within the particles. To attain this object, the present invention employs a step preceding post-condensation, consisting in dipping the solidified polymer in a swelling medium.

Therefor, the invention proposes a process for manufacturing polyester comprising at least the following steps:

a) esterifying or transesterifying a carboxylic diacid or a diester of a carboxylic diacid with a diol, b) polymerizing in melt phase the esterification or transesterification product, c) solidifying and granulating, d) placing in contact the granules with a liquid swelling medium, e) post-condensing the granules in solid phase.

These steps constitute the essential operations necessary to carry out the process. The process may comprise others. Each of these steps may eventually be subdivided in elementary operations within several installations.

Polymerization step b) is in fact widely applied by industry. It consists in a condensation in the molten state of the reaction product of step a). It is in general catalyzed by a metal compound, for example, antimonium trioxide. During the advancement of the reaction, the product becomes more and more viscous.

Beyond a certain viscosity, the type of technology presently employed does not permit the reaction to proceed. The limit in viscosity attained in the molten phase is generally around 85 ml/g. If higher molecular weight compounds are desired, it is necessary to proceed with a solid phase condensation.

By viscosity it is to be understood the viscosity index (VI) in ml/g measured at 25° C. with the help of a Ubbelohde type viscosimeter for a 0.005 g/ml solution of polymer dissolved at 115° C. in a mixture comprising 50% by weight of phenol and 50% by weight of 1,2-dichlorobenzene.

During step c) the molten polymer coming from step b) is made into the form of a granular solid, for example by extrusion and cooling. It is then essentially amorphous. The granules exitting this step can be used either as they are, eventually after crystallization, or can be submitted to solid phase post-condensation for applications requiring higher molecular weight polymers.

The solid phase post-condensation carried out during step e) consists in heating the granules coming from step c) to temperatures comprised between the glass transition temperature of the polymer and the melt temperature thereof. This condensation is accompanied by the separation of reaction products, especially of diol.

In order to speed up the post-condensation kinetics, the present invention comprises a step d) of preparing the granules coming from step c). This step consists in placing in contact said granules with with a liquid swelling medium. The operation makes the granules become porous, thereby reducing the diffusional path, and thus increasing their specific exchange surface.

The diffusion of the diol coming from post-condensation is thus facilitated. Such a property permits speeding up the subsequent solid phase condensation step. The placing in contact may be effected by any means, for example by immersion. The step may be effected either continuously or discontinuously.

As examples of liquid swelling media, the following compounds can be mentioned: methylene chloride, dioxane, nitromethane, acetone, benzene, dimethylformamide, dimehtylacetamide, methanol, ethanol, chloroform, trichloroethylene, tetrachloroethylene, carbon tetrachloride, toluene, benzyl alcohol, methyl-vinyl-ketone. Acetone particularly provides very good results.

The above-described steps are necessary for the realization of the invention, but the process can include others, either upstream, downstream or intermediately. The process according to the invention may particularly include a step of crystallizing the granules between the placing in contact and the solid phase condensation steps.

The swelling liquid medium may be used at room temperature or maximum at a temperature lower than the boiling temperature of the liquid and the melt temperature of the treated polymer.

The placing in contact with the swelling medium may be applied to polymers having molecular weights advantageously higher than a molecular weight corresponding to a viscosity index around 30 ml/g. The process may be applied to polymers having higher viscosity indexes, especially until viscosity indexes around 90 ml/g. It may alternatively be applied to very high viscosity index polymers, for example up to 130 ml/g, in order to manufacture very high molecular weight compounds.

The carrying out of the step of placing in contact with the swelling medium provides substantial technological improvements to the process. It can thus permit reducing the number of polymerization reactors. It can permit simplifying or eliminating the crystallization procedures usually carried out. For example, since the classic process for preparing polymers after solidification and before post-condensation consists in a passage through three units for pre-crystallization, crystallization and crystallization-conditioning the invention can reduce the number of operations so that not more than two placing in contact steps are employed, for example through immersion, and crvstallization/conditioning.

The process according to the present invention can be used to prepare polyester-type polymers. It can be applied to polyesters obtained from the following diacids: terephthalic acid, isophthalic acid, naphthalenedioic acid, and mixtures thereof, and the following diols: ethylene glycol, propylene glycol, butane diol, neopentyl glycol, diethylene glycol, bisphenol and mixtures thereof. It can be applied particularly to the manufacture of poy(ethylene terephthalate).

Other details and advantages of the invention will become apparent from the examples given hereunder for illustrative purposes only.

EXAMPLE 1

Granules of poly(ethylene terephthalate) polymer manufactured in a conventional manner, with an initial viscosity index (VI) of 73 ml/g, are dipped during 4 days in acetone, at a temperature of 20° C. They are dried at room temperature during 12 hours. They are then subjected to a solid phase post-condensation at 190° C. during 20 hours under vacuum. The viscosity index (final VI) of the obtained granules is measured.

EXAMPLE 2

Granules of poly(ethylene terephthalate) polymer manufactured in a conventional manner, with an initial viscosity index (VI) of 74,7 ml/g, are dipped during 2 hours in acetone, at a temperature of 50° C. They are dried at room temperature during 12 hours. They are then subjected to a solid phase post-condensation at 214° C. during 31 hours under vacuum. The viscosity index (final VI) of the obtained granules is measured according to the procedures previously set forth.

Comparative Examples

Comparative samples are subjected to the same heat treatment without immersion in acetone. The sample of comparative example 1 is submitted to a 20-hour post-condensation at 190° C. The sample of comparative example 2 is submitted to a 31-hour post-condensation at 214° C.

The results are respectively presented in tables 1 and 2. The efficiency of the solid phase post-condensation can be defined by the relationship between the differences in viscosity obtained during the post-condensation applied during the same period of time both for the compound having been submitted to an immersion and to a compound not having been submitted to immersion. Hence, for a compound not having been submitted to immersion (comparative examples) the efficiency is the reference efficiency, equal to 1.

TABLE 1

| | Initial VI (ml/g) | Final VI (ml/g) | Difference | Efficiency |
| --- | --- | --- | --- | --- |
| Comparative Example | 73 | 88.3 | 15.3 | 1 |
| Example 1 | 73 | 95.2 | 22.2 | 1.45 |

It appears that the invention permits attaining 45% of the solid phase post-condensation.

TABLE 2

| | Initial VI (ml/g) | Final VI (ml/g) | Difference | Efficiency |
| --- | --- | --- | --- | --- |
| Comparative Example | 74.7 | 100.5 | 25.8 | 1 |
| Example 2 | 734.7 | 108.9 | 34.2 | 1.33 |

It appears that the invention permits attaining 33% of the solid phase post-condensation.

What is claimed is:

1. A process for manufacturing polyester comprising the following steps:

a) esterifying or transesterifying a carboxylic diacid or a diester of a carboxylic diacid with a diol, b) polymerizing in melt phase the esterification or transesterification product, c) solidifying and granulating, d) placing in contact the granules with a liquid swelling medium, e) post-condensing the granules in solid phase.

2. The process of claim 1, comprising a crystallization step between the steps of placing in contact with the liquid swelling medium and the solid phase post-condensation.

3. The process of claim 1, wherein the swelling medium is heated to a temperature under the melting point of the polymer.

4. The process of claim 1, wherein the viscosity index of the compound resulting from the polymerization step is higher than 30 ml/g.

5. The process of claim 2, wherein the swelling medium is heated to a temperature under the melting point of the polymer.

6. The process of claim 5, wherein the viscosity index of the compound resulting from the polymerization step is higher than 30 ml/g.

7. The process of claim 2, wherein the viscosity index of the compound resulting from the polymerization step is higher than 30 ml/g.

8. The process of claim 3, wherein the viscosity index of the compound resulting from the polymerization step is higher than 30 ml/g.

* * * * *